(No Model.)
J. F. ADAMS.
SPOOL OR BALL HOLDER.
No. 316,595. Patented Apr. 28, 1885.
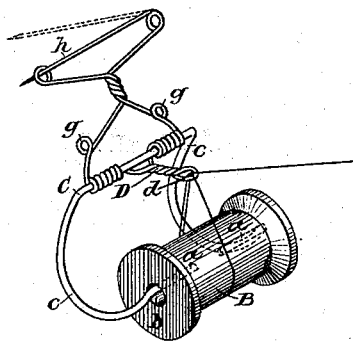
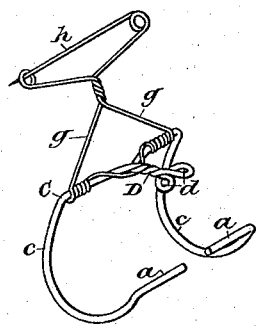

UNITED STATES PATENT OFFICE.

JOHN F. ADAMS, OF IRVINGTON, NEW YORK.

SPOOL OR BALL HOLDER.

SPECIFICATION forming part of Letters Patent No. 316,595, dated April 28, 1885.

Application filed April 7, 1884. (No model.)

*To all whom it may concern:*

Be it known that I, JOHN F. ADAMS, a citizen of the United States, residing in the city of Irvington, county of Westchester and State of New York, have invented certain new and useful Improvements in Spool or Ball Holders, fully described and represented in the following specification and the accompanying drawings, forming a part of the same.

This invention relates to a device for holding and supporting spools or balls of thread, yarn, or twine while they are being drawn from or unwound for use, it being the object of the invention to provide a device for this purpose which will so hold the spool or ball that the thread, yarn, or twine may be readily unwound therefrom without danger of snarling or tangling, and by which also the free end of the contents of the spool or ball will be prevented from unwinding, except when actually drawn upon. It is also the object of the invention to provide means by which the spool or ball holding device may be conveniently attached to the clothing of the user, so that the spool or ball will always be at hand when it is desired to unwind any of the contents for use.

In the accompanying drawings, Figure 1 is a perspective view of one form of holder embodying the invention, a spool of thread being shown as supported in position for use. Fig. 2 is a similar view of a holder embodying the invention in a slightly-modified form, the spool being removed.

Referring to said figures, it will be seen that the holder in both of the forms shown consists of a horizontally-arranged axle or spindle upon which the spool or ball is supported and about which it turns freely as the contents is unwound; a frame which supports the spindle in such position that the spool or ball is held away from the surface to which the holder is attached; a tension device through which the thread, yarn, or twine passes, and which serves to prevent the too free unwinding of the same, and a fastening device by which the holder may be attached to the clothing of the user.

The frame C, which supports the spindle, consists of a wire bent to the form of a yoke, the arms $c$ of which are a sufficient distance apart to admit the spool or ball B between them, as shown in Fig. 1. These arms are bent forward, so as to hold the spool or ball away from the surface to which the holder is attached, and are bent inward at their outer ends, so as to form lugs or projections $a$, which enter the openings $b$ in the ends of the spool or ball, and form the spindle upon which it turns as the contents are unwound. This construction permits the spool or ball to be inserted and removed by simply springing the arms $c$ apart, and is consequently the most desirable construction for the spindle. The spindle may, however, be made separate from the arms $c$, and be supported in eyes or bearings formed in the ends of the arms.

The tension device D consists of a bar or projection, which is provided with one or more eyes, $d$, through which the free end of the thread, yarn, or twine is passed one or more times, as shown in Fig. 1, so as to create sufficient friction to prevent the too free unwinding from the spool or ball. The eye or eyes $d$ of the tension device may be round, as shown; or, if preferred, they may be elongated and contracted at one end, so as to cause more friction upon the thread, yarn, or twine.

The frame C may be hinged to a backing or support made of cloth, leather, or any suitable material, and this support may be provided with any suitable means—as a buckle, clasp, pin, hook, or button-hole—for attaching it to the clothing of the user; or it may be provided with a suitable device for attaching it directly to the clothing of the user. As shown, this fastening device consists of one or more wires, $g$, wound round the frame in such manner as to form a hinge, and bent at their ends so as to form a clasp-pin, $h$. This permits the frame to adjust itself with relation to the fastening device so as to assume any desired position.

The tension device D may be made integral with the frame C, as shown in Fig. 2; or, if preferred, it may be made integral with the fastening device, being formed of a part of the wires $g$, as shown in Fig. 1. This latter form is preferable, as it permits the tension device to be turned upward away from the spool or ball, so as to facilitate the passing of the free end of the thread, yarn, or twine through the eye or eyes $d$.

The device herein described will be found not only particularly useful in knitting and crocheting, but also well adapted to meet the wants of seamstresses, salesmen, and others, who desire to carry a spool or ball of thread, yarn, or twine in such position that it will be always at hand and in condition to have the contents readily withdrawn.

What I claim is—

A spool or ball holder consisting of the frame C, having the forwardly-extending arms c, between which is arranged the horizontal spindle for supporting the spool or ball, the tension device through which the thread or yarn is passed to prevent the too free unwinding of the same, and a fastening device connected to the frame by a hinge-joint, and adapted to attach the holder to the clothing of the user, all substantially as described.

In testimony whereof I have hereunto set my hand in the presence of two subscribing witnesses.

JOHN F. ADAMS.

Witnesses:
J. A. HOVEY,
GEO. H. GRAHAM.